United States Patent [19]
Nagasaki

[11] 3,728,913
[45] Apr. 24, 1973

[54] PLANETARY GEAR TYPE REVERSING DEVICE

[75] Inventor: Michisuke Nagasaki, Toyonaka, Japan

[73] Assignee: Yanmar Diesel Engine Co., Ltd., Osaka, Japan

[22] Filed: May 25, 1971

[21] Appl. No.: 146,699

[30] Foreign Application Priority Data

June 2, 1970 Japan.........45/55206

[52] U.S. Cl....................................................74/785
[51] Int. Cl...........................F16h 3/46, F16h 57/10
[58] Field of Search................................74/788, 785

[56] References Cited

UNITED STATES PATENTS

| | | |
|---|---|---|
| 680,825 | 8/1901 | Westinghouse ........................74/785 |
| 1,548,917 | 8/1925 | Vincent..................................74/788 |
| 1,629,021 | 5/1927 | Culver....................................74/785 |
| 2,331,684 | 10/1943 | Henningsen............................74/785 |
| 2,558,840 | 7/1951 | Gordon ..............................74/785 X |
| 2,672,769 | 3/1954 | Gerst......................................74/788 |
| 2,815,974 | 12/1957 | Stubbe................................74/785 X |
| 2,860,529 | 11/1958 | Sommer..................................74/785 |
| 2,974,753 | 3/1961 | Allin, Sr. et al....................74/785 X |
| 3,097,546 | 7/1963 | Kelbet et al. ...........................74/788 |
| 2,472,559 | 6/1949 | Arnold et al. ..........................74/785 |

FOREIGN PATENTS OR APPLICATIONS

| | | |
|---|---|---|
| 784,573 | 10/1957 | Great Britain..........................74/785 |
| 861,568 | 2/1961 | Great Britain..........................74/785 |

Primary Examiner—Charles J. Myhre
Assistant Examiner—Thomas C. Perry
Attorney—Stevens, Davis, Miller & Mosher

[57] ABSTRACT

A reversing device of planetary gear type for marine engines and the like comprising a sun gear mounted on an input shaft, a plurality of inner planet gears in mesh with the sun gear, a plurality of outer planet gears in mesh with said inner planet gears, an internal gear in mesh with said outer planet gears, bearing discs which support said inner and outer planet gears, an output shaft to which one of said bearing discs is fixedly secured, said internal gear being slidably supported only by the planet gears so as to be gripped either between an extension of the other bearing disc and a normal-running pressing member or between a protrusion of the reversing gear case and a reversing pressing member, and a hydraulic piston which is adapted to move into and out of the reversing gear case to attain pressure contact with a side of one of the bearing discs to avoid unintended rotation of the output shaft while the device is in the neutral position.

3 Claims, 4 Drawing Figures

M. NAGASAKI
INVENTOR

PLANETARY GEAR TYPE REVERSING DEVICE

This invention relates to improvements of a reversing device which makes use of planetary gears.

Conventional reversing gears of this type require members to support the internal gear of the planetary gears, and it has offered difficulties in reducing their size and weight.

The present invention has for its object to provide a smaller and lighter reversing device by omitting the members to support the internal gear of the planetary gears, and, instead, supporting the internal gear axially movably and floatingly with planet gears which mesh therewith, and further utilizing one side of the reversing gear case and an extension of a bearing member of the planet gears, both inherent to a conventional reversing gear, as members to grip the internal gear in between.

Thus, according to this invention, a reversing gear utilizing planetary gears is obtained which comprises a plurality of inner planet gears in mesh with a sun gear mounted on an input shaft, a plurality of outer planet gears in mesh with said inner planet gears, an internal gear in mesh with said outer planet gears, bearing discs to support said inner and outer planet gears, and an output shaft secured to the bearing discs, said internal gear supported by the planet gears alone being detachably held either between an extension of one of said bearing discs and a piston or a pressing member for normal running or between the reversing gear case and a reversing piston or a pressing member.

The present invention will be better understood from the following description taken in conjunction with the accompanying drawings, in which.

Figure 1:
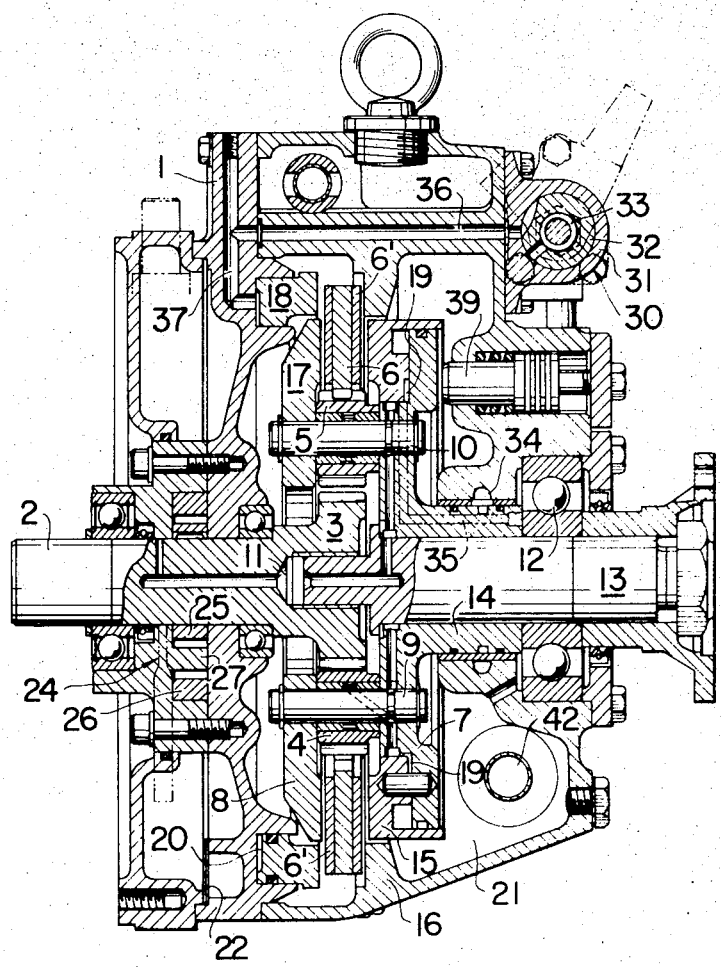
FIG. 1 is a vertical sectional view of a reversing device embodying this invention.
Figure 2:
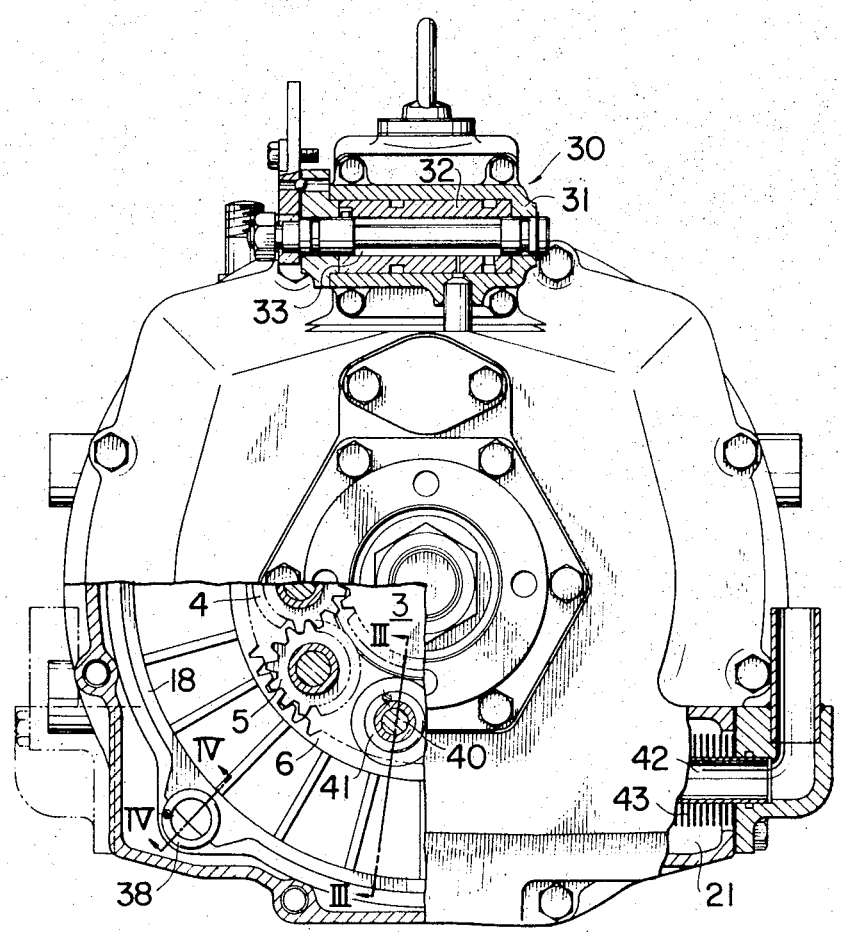
FIG. 2 is a side elevational view, partly in section, of the reversing device of FIG. 1.

Referring now to FIGS. 1 and 2, there is shown a reversing gear case 1, in which an input shaft 2 is journalled, carrying a sun gear 3 on its inner end. The sun gear 3 is in mesh with a plurality of inner planet gears 4, which in turn are meshed with the same number of outer planet gears 5. These outer planet gears 5 are surrounded by an internal gear 6 in mesh therewith. As shown the internal gear 6 is provided with friction plates 6' on both sides and is floatingly supported by the outer planet gears alone. With a face width narrower than that of the outer planet gears 5, the internal gear 6 is axially slidable over the latter gears. The inner and outer planet gears 4, 5 are revolvably supported by shafts 9, 10, which shafts are journalled at both ends in bearing discs 7, 8, respectively. An output shaft 13 is provided coaxially with the input shaft, fitted at one end into an end recess 11 of the input shaft and supported midway by a ball bearing 12 which is held in the reversing gear case. To the output shaft 13 is keyed the hub 14 of the bearing disc 7. Adjacent one side of the internal gear 6, there are provided a hydraulically-driven normal-running piston 15 on the bearing disc 7 and an inward protrusion 16 from the reduction gear case 1. Adjacent the other side of the internal gear, there are provided an extension 17 of the bearing disc 8 and a hydraulically-driven reversing piston 18 mounted on the inner wall of the reduction gear case 1. The normal-running piston 15 and the extension 17 of the bearing disc 8, on one side, and the inward protrusion 16 of the reversing gear case and the reversing piston 18, on the other side, have annular surfaces opposite to each other with the internal gear 6 held in between. The normal-running piston and reversing piston are associated with their respective hydraulic oil chambers 19 and 20. Also shown are a cooling water line 42 and fins 43 for cooling the hydraulic oil.

Now the hydraulic system for supplying hydraulic oil to the oil chambers will be described. The lower portion of the reduction gear case 1 constitutes an oil reservoir 21. The oil is drawn through a filter 22 into a gear pump 24, which is constructed with an external gear 25 mounted coaxially on the input shaft 2, an internal gear 26 revolvably in mesh with the external gear but eccentrically with respect to the external gear, and a crescent-shaped partition wall 27 between the two gears. The oil from the gear pump 24 reaches a directional control valve 30 by way of passages (not shown) formed in the reversing gear case 1. The directional control valve consists of a valve housing 31 and a valve body 32, and the portion of the valve housing 31 attached to the reversing gear case 1 is formed with an inlet for the oil from the gear pump and two oil outlets communicating respectively to the oil chambers 19, 20 of the normal and reverse pistons, along a line and spaced apart from each other axially of the valve body 32, and an oil escape port is provided which leads to the oil reservoir 21. The valve body 32 can be turned by a lever attached to its outer end to any of three positions, forward (normal running), neutral, and backward (reversing).

Figure 3:
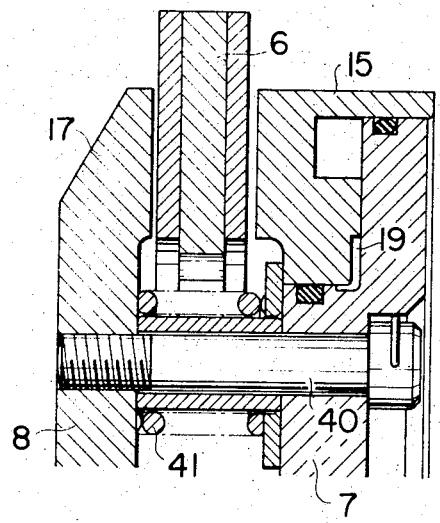
FIG. 3 is an enlarged sectional view taken along the line III — III of FIG. 2.

The operation of the reversing device according to the invention will now be explained. If the lever of the directional control valve 30 is turned from the neutral position as shown to the forward position, the hydraulic oil supplied from the gear pump into the passage 33 inside the valve body 32 passes through a radial passage of the valve body 32 which is aligned to the oil outlet for normal running, and through passages 34, 35 formed in the reversing gear case 1 and bearing disc 7, into the oil chamber 19 of the normal-running piston 15, thereby urging the piston left-ward as viewed in FIG. 1. Accordingly the internal gear 6 is urged leftward by the piston 15 until it is tightly held between the piston and the extension 17 of the bearing disc 8. In this manner the internal gear 6, and inner and outer planet gears 4, 5 are combined integrally, so that the rotation of the input shaft 2 is directly transmitted to the output shaft 13 and the latter begins to run in the same direction and at the same speed as the former. Then, if the directional control valve 30 is shifted to the backward position, another radial passage of the valve body 32 is aligned to the revering oil outlet, generally in the same way as already described, with the result that the oil flows through the passages 36, 37 into the oil chamber 20 of the reversing piston 18, thereby urging the piston rightward as viewed in FIG. 1. Accordingly the internal gear 6 is caused to slide rightward until it is sandwiched between the piston and the protrusion 16 of the case and is fixedly secured to the case. In this case the rotation of the input shaft 2 is transmitted to the outer planet gears 5 via the inner planet gears 4, and the gears 5 in mesh with the fixed internal gear 6 revolves about the sun gear. Hence the bearing discs 7, 8 of the planet gears cause the output shaft 13 to run in the reverse direction at a different speed. By this change-over, the oil in the oil chamber 19 of the normal-running piston enters an arcuate escaping recess of the valve body 32 through passages 35, 34, and thence returns to the oil reservoir 21 via the escape port of the valve housing. At the same time, the piston 15 is brought back to its original position by virtue of a return spring 41 provided on a shaft 40 between the bearing discs 7, 8, as shown in FIG. 3.

Figure 4:
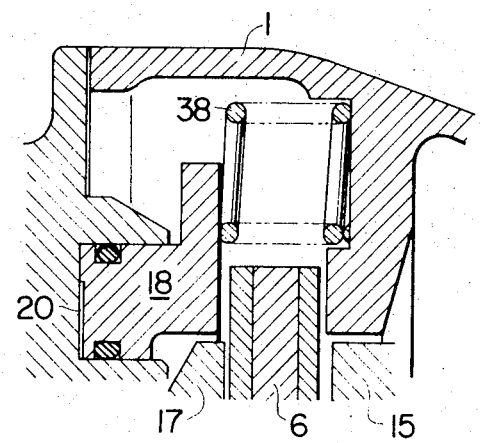
FIG. 4 is an enlarged sectional view taken along the lines IV — IV of FIG. 2.

If the directional control valve is then reset to the neutral position, the oil from the oil chamber 20 enters the escaping recess of the valve body 32 through the passages 37, 36, the piston 18 is returned to its original position by the action of a return spring 38 shown in FIG. 4, thus setting the internal gear 6 free.

Numeral 39 designates a brake piston for keeping the bearing discs from turning while the reversing device is set neutral. As long as the directional control valve is in the neutral position, the hydraulic oil is supplied to the right side of this piston to press the bearing disc 7 against turning, in order to avoid any rotation of the output shaft induced by the rotation of the input shaft.

With the construction above described, the device according to this invention operates in such a way that, when the internal gear 6 is gripped between the extension 17 of the bearing disc 8 and the piston 15 for normal running, the input shaft 2 is allowed to transmit its rotation to the output shaft 13 in the same direction and at the same speed and, when the internal gear 6 is conversely gripped between the protrusion 16 of the reversing gear case and the reversing piston 18, the input shaft 2 is allowed to transmit its rotation to the output shaft 13 in the reverse direction and at a different speed.

Therefore, the device of the invention has the following advantages:
1. Because the internal gear 6 is meshed with, and supported by, the planet gears 5, there is no need of members to support the internal gear 6. Accordingly the gear is most simplified in construction and the reversing device containing the same can be reduced in size. Moreover, despite the use of the two pistons 15, 18 for normal running and reversing, the internal gear 6 is positively gripped in position since it is displaced in the axial direction.
2. Because the reversing device is so constructed that the pistons 18, 15 are urged respectively against the protrusion 16 formed on the inner wall of the reversing gear case which is inherent to a reversing gear utilizing planetary gears and the extension 17 formed on the bearing disc 8, the number of component parts can be remarkably saved, and not only the intended purposes of reducing the size and weight but also a great saving in the manufacturing cost are achieved.

The reversing device of the present invention can prove particularly valuable when used with marine engines.

I claim:
1. A reversing apparatus utilizing planetary gears housed in a case comprising a sun gear mounted on an input shaft, a plurality of inner planet gears in mesh with the sun gear, a plurality of outer planet gears in mesh with said inner planet gears, an internal gear in mesh with said outer planet gears and provided with friction plates on opposite sides thereof, first and second bearing discs supporting said inner planet gears and outer planet gears, an output shaft fixedly secured to one of said bearing discs, a first pressing member provided on the surface of said one bearing disc facing the other disc, a protrusion formed on the inner wall of said case, and a second pressing member provided on the inner wall of said case opposite said protrusion, said internal gear having an inner circumferential portion thereof located between said first pressing member and said other bearing disc, and an outer circumferential portion thereof located between said protrusion and said second pressing member to be gripped between either of the opposing pairs.

2. The reversing apparatus according to claim 1, further comprising means for hydraulically selectively actuating said first and second pressing members to urge said internal gear into selective engagement with said one bearing disc and said protrusion.

3. The reversing apparatus according to claim 2, further comprising means for disengaging both of said first and second pressing members from contact with said internal gear and returning said internal gear to a neutral position.

* * * * *